(12) United States Patent
Van Houtte

(10) Patent No.: US 6,932,255 B2
(45) Date of Patent: Aug. 23, 2005

(54) BOTTLE HOLDER FOR CYCLES OR OBJECTS

(76) Inventor: Philippe Van Houtte, 35, rue des ecoles, Ossey les trois Maison 10100 (FR)

( * ) Notice: Subject to any disclaimer, the term of this patent is extended or adjusted under 35 U.S.C. 154(b) by 178 days.

(21) Appl. No.: 10/385,275

(22) Filed: Mar. 10, 2003

(65) Prior Publication Data

US 2004/0178244 A1 Sep. 16, 2004

(51) Int. Cl.$^7$ ............................................. B62J 11/00
(52) U.S. Cl. ........................ 224/414; 224/425; 224/926; 248/311.2
(58) Field of Search ..................... 224/148.1, 148.4, 224/400, 401, 544, 545, 547, 414, 425, 926, 412, 418, 419, 431, 434, 407, 274; 248/145.6, 302, 311.2; 220/480, 737, 751, 475

(56) References Cited

U.S. PATENT DOCUMENTS

| 4,009,810 | A | * | 3/1977 | Shook ........................ 224/414 |
| 4,345,704 | A | | 8/1982 | Boughton .................... 224/39 |
| 4,437,596 | A | * | 3/1984 | Shook ........................ 224/414 |
| 5,040,709 | A | | 8/1991 | Neugent ...................... 224/35 |
| 5,060,832 | A | | 10/1991 | Link ......................... 224/32 R |
| 5,145,138 | A | * | 9/1992 | Schlanger et al. ....... 248/311.2 |
| 5,170,981 | A | | 12/1992 | Lin .......................... 248/311.2 |
| 5,392,971 | A | * | 2/1995 | Hsu .......................... 224/414 |
| 5,839,709 | A | * | 11/1998 | Leonard .................. 248/311.2 |
| 6,616,021 | B1 | * | 9/2003 | Shih ........................... 224/414 |
| 2001/0042767 | A1 | * | 11/2001 | Campagnolo ............... 224/414 |

FOREIGN PATENT DOCUMENTS

FR       2615158 A1 * 11/1988   ............ B62J/11/00

* cited by examiner

Primary Examiner—Lee Young
Assistant Examiner—Harry Grosso
(74) Attorney, Agent, or Firm—Charles E. Baxley

(57) ABSTRACT

A bottle holder includes a bottle cage having a peripheral chamber to receive a water bottle, and having one or more orifices. A bracket includes one or more bulges engaged into the orifices of the bottle cage to prevent the bottle cage from moving up and down and sidewise relative to the bracket. One or more fasteners may be engaged through the bracket and the bottle cage to secure the bottle cage and the bracket to various objects, such as the cycles. One or more seats may be attached to the bottle cage, and each may include a cavity to receive the bulge of the bracket, and to solidly retain the bottle cage between the bracket and the seats.

6 Claims, 3 Drawing Sheets

BOTTLE HOLDER FOR CYCLES OR OBJECTS

BACKGROUND OF THE INVENTION

1. Field of the Invention

The present invention relates to a bottle holder, and more particularly to a bottle holder for attaching to cycles or to various objects, and to hold and fasten water bottles, etc. to cycles or various objects, such as clothes of users, etc.

2. Description of the Prior Art

Various kinds of typical bottle holders have been developed to hold and fasten water bottles, etc. to cycles, and normally comprise a number of elements or brackets formed by metallic wires, cables, etc.

U.S. Pat. No. 4,345,704 to Boughton discloses one of the typical bottle holders including a mount for securing or attaching bottles with hook and loop securing devices. However, it will be difficult to attach the hook and loop securing devices to the conventional bottles, such that the conventional bottles may not be attached to the mount of Boughton. The users have to buy additional bottle holders and bottles for attaching the bottles to the cycles with the bottle holders.

U.S. Pat. No. 5,040,709 to Neugent, U.S. Pat. No. 5,060,832 to Link, and U.S. Pat. No. 5,170,981 to Lin disclose three other typical bottle holders and comprise a number of elements or brackets formed by metallic wires, cables, etc., that may not be easily and quickly formed or machined to form the bottle holders. None of the typical bottle holders comprise a planer structure to clamp or to retain the bottles in the bottle holders.

The present invention has arisen to mitigate and/or obviate the afore-described disadvantages of the conventional bottle holders.

SUMMARY OF THE INVENTION

The primary objective of the present invention is to provide a bottle holder including a planer and/or curved structure to clamp or to retain the bottles in the bottle holders.

The other objective of the present invention is to provide a bottle holder including few elements that may be easily and quickly manufactured and assembled and attached onto cycles or the other objects.

In accordance with one aspect of the invention, there is provided a bottle holder for attaching to various objects, the bottle holder comprising a bottle cage including a peripheral structure having a chamber formed therein to receive a bottle therein, the bottle cage including an inner peripheral surface and an outer peripheral surface formed thereon, and the bottle cage including at lest one orifice formed therein, a bracket engaged onto the bottle cage, and including at least one bulge extended therefrom to engage into the orifice of the bottle cage, and to prevent the bracket from moving up and down and sidewise relative to the bottle cage, and at least one fastener engaged through the bracket and the bottle cage, to attach the bottle cage and the bracket to the objects. The engagement of the bulge of the bracket into the orifice of the bottle cage may prevent the bottle cage from being moved relative to the bracket. The bottle holder may be attached to such as the cycles, the waist belts of the users, or the other objects. In addition, the bracket and the bottle cage may be easily secured onto various objects with the fastener.

The bottle cage may further include an opening formed therein to define a pair of flaps, and to retain the bottle in the chamber of the bottle cage.

The bracket may include a lower portion having an arm extended therefrom to engage into the bottom portion of the bottle cage, and to engage with and to retain the bottle in the bottle cage.

The bulge of the bracket includes a recess formed therein, the fastener includes a head received in the recess of the bracket. The bulge of the bracket includes a peripheral rib extended into the recess thereof, to define a reduced aperture in the bulge, and to receive the fastener.

One or more seats may further be provided and engaged onto the bottle cage, and each may include a cavity formed therein to receive the corresponding bulge of the bracket. The seat may include a peripheral flange extended into the cavity thereof, to define an aperture in the seat, and to receive the fastener.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
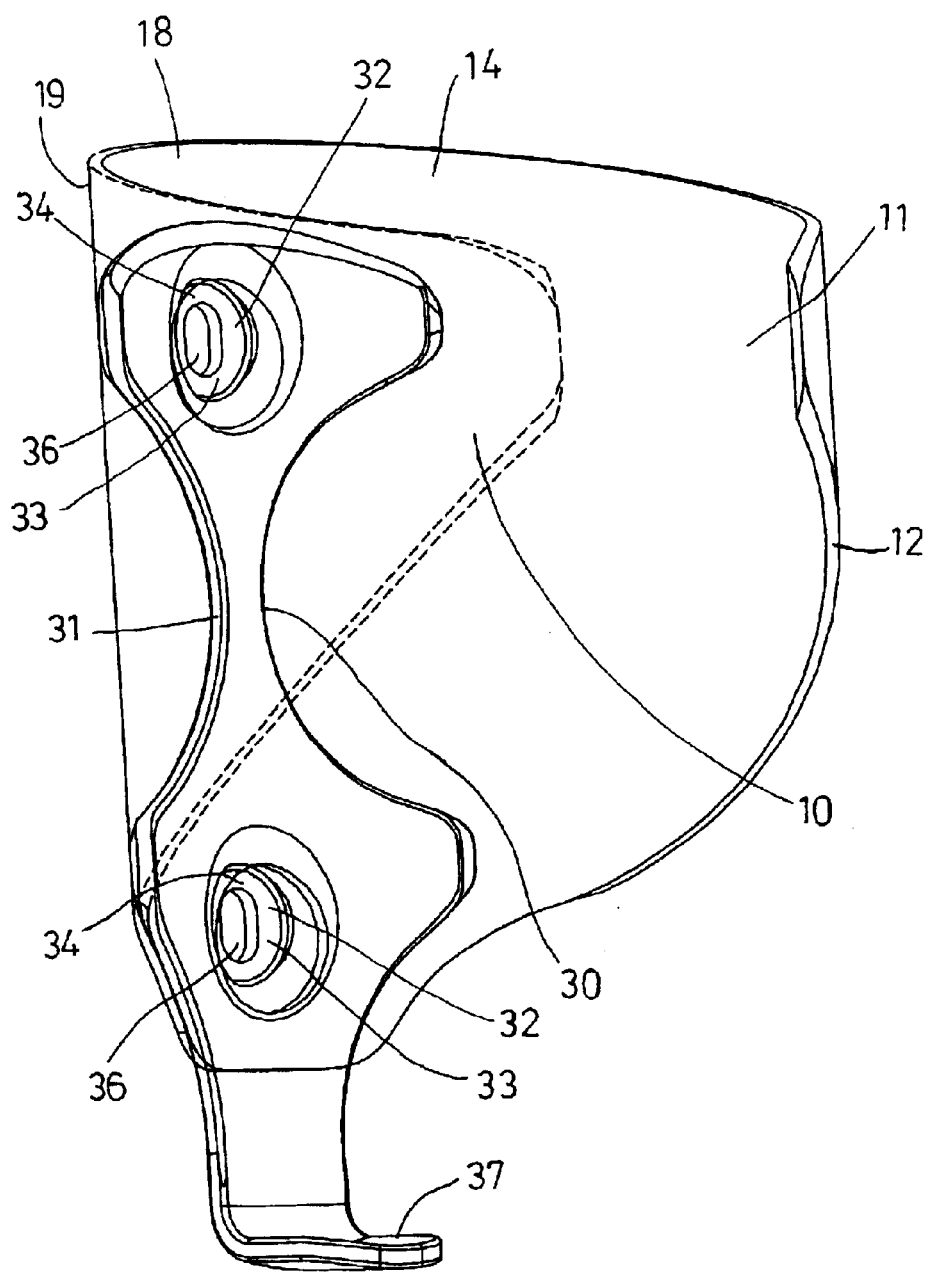
FIG. 1 is a perspective view of a bottle holder in accordance with the present invention.
Figure 2:
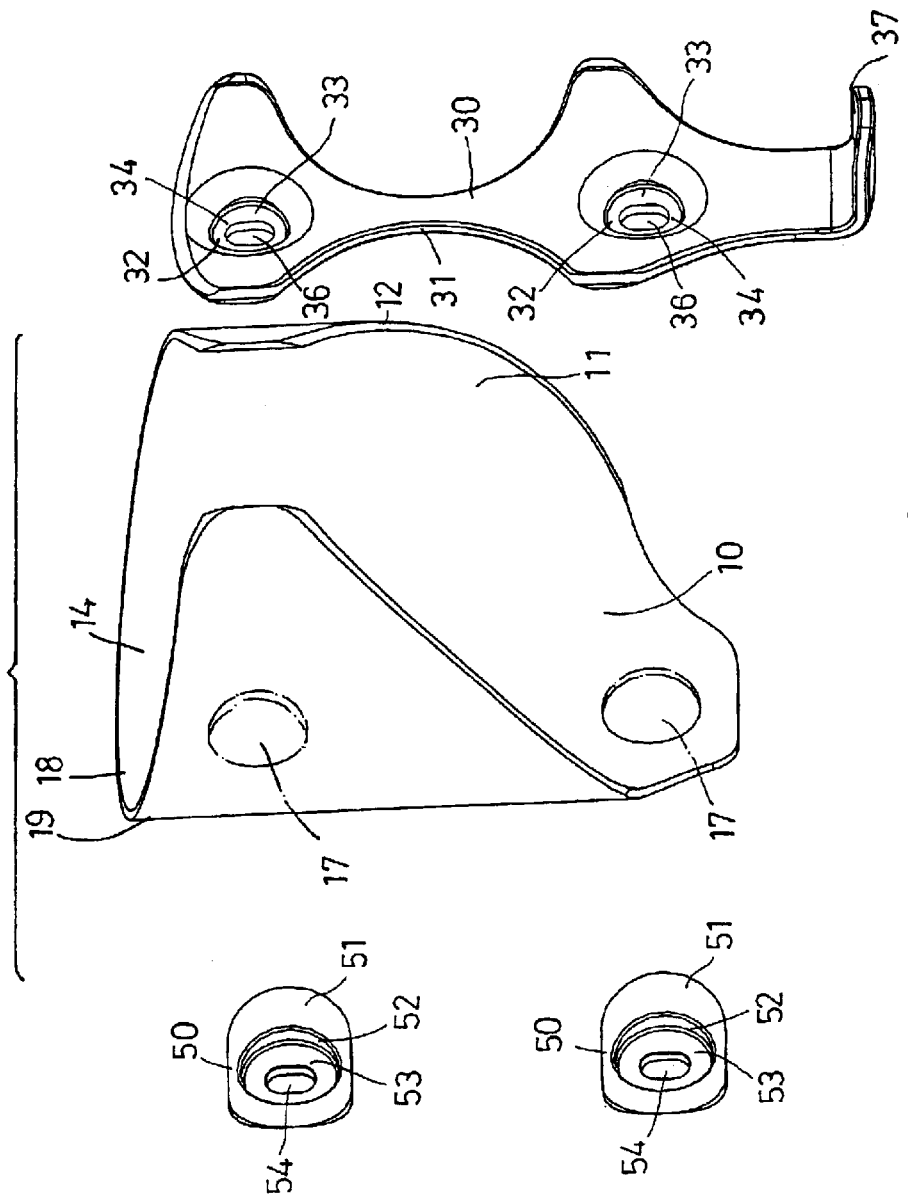
FIG. 2 is an exploded view of the bottle holder.

Referring to the drawings, and initially to FIGS. 1 and 2, a bottle holder in accordance with the present invention comprises a bottle cage 10 including a substantially cylindrical or peripheral structure having a chamber 14 formed therein to receive a water bottle 70 (FIG. 3) or the like therein. The water bottle 70 may be engaged into the chamber 14 of the bottle cage 10 via the open upper portion of the bottle cage 10.

It is preferable, but not limited thereto, that a gap or opening 11 is formed therein, such as formed in the side or front portion thereof, to form or define a pair of flaps 12 therein, for allowing the water bottle 70 to be engaged into the chamber 14 of the bottle cage 10 from either the side portion or the front portion thereof.

The bottle cage 10 may be made of metal materials, such as aluminum materials, or plastic or fiber or composite materials, for allowing the flaps 12 thereof to have a suitable resilience to clamp and to retain the bottle 70 in the bottle cage 10. The bottle cage 10 includes one or more, preferably two orifices 17 formed in the middle or rear portion thereof, and formed through an inner peripheral surface 18 and an outer peripheral surface 19 thereof.

The bottle cage 10 may include a greatly reduced thickness when the bottle cage 10 is made of glass fiber materials, carbon fiber materials, or the other fiber composite materials, that may also include a great resilience to suitably clamp or retain the water bottle 70 within the chamber 14 of the bottle cage 10.

Figure 3:
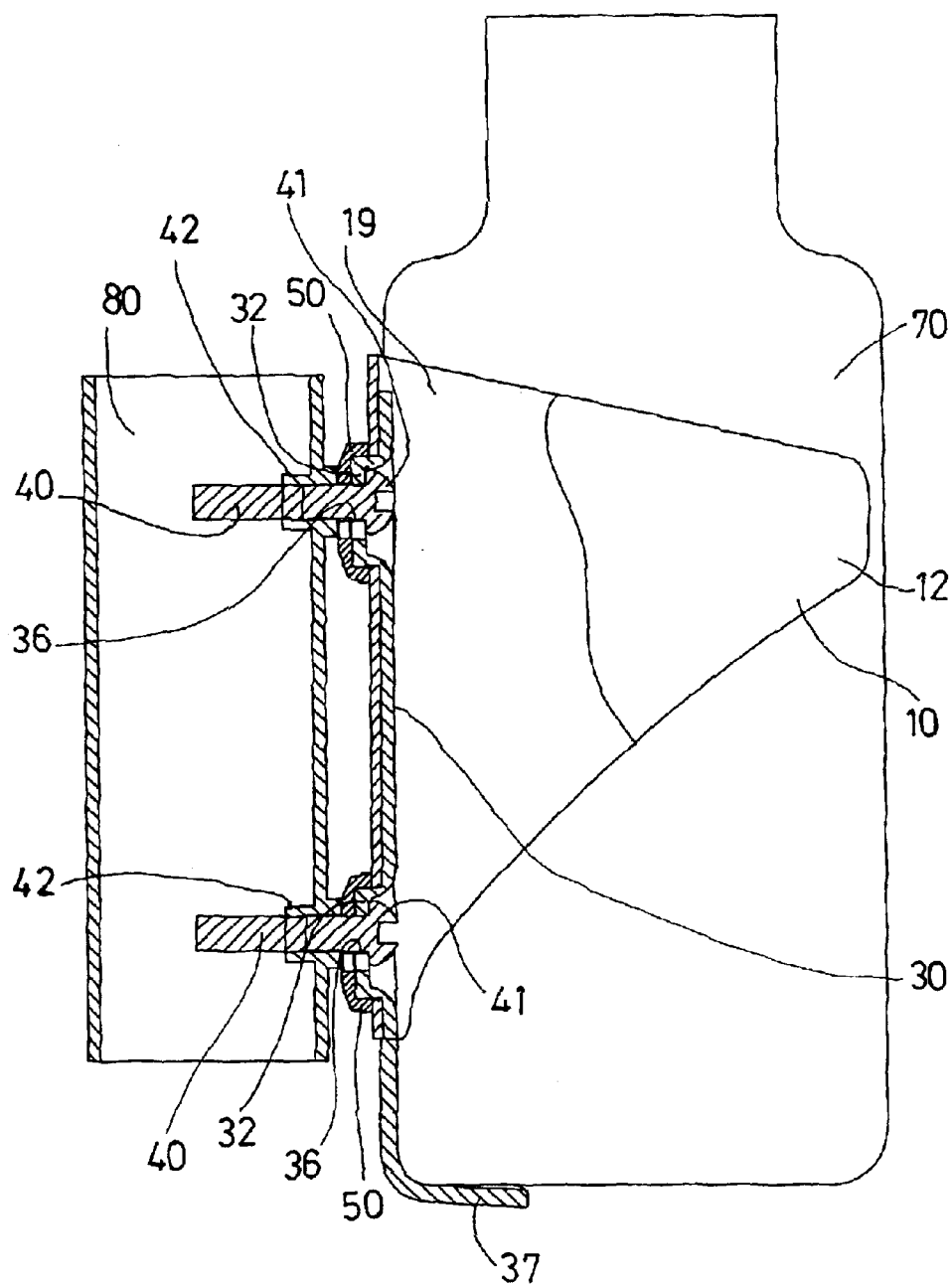
FIG. 3 is a partial cross sectional view of the bottle holder, illustrating the attachment of the bottle holder to cycles.

A bracket 30 is provided for attaching or securing the bottle cage 10 to various objects, such as the frame 80 of cycles (FIG. 3). The bracket 30 may be attached to the inner or outer portion of the bottle cage 10. For example, the bracket 30 may include a rear surface 31 for engaging onto the inner peripheral surface 18 of the bottle cage 10, or a front surface for engaging onto the outer peripheral surface 18 of the bottle cage 10, and thus for allowing the bracket 30 to be attached to either the inner or the outer portion of the bottle cage 10.

The bracket 30 further includes one or more, such as two bulges 32 extended therefrom, to engage into the orifices 17 of the bottle cage 10 respectively, and to prevent the bracket 30 from moving upwardly, downwardly, or sidewise relative to the bottle cage 10. For example, the bulges 32 may be extended forwardly or rearwardly from the front or rear surface 31 of the bracket 30, to suitably engage into the orifices 17 of the bottle cage 10 respectively.

The bracket 30 may further include a recess 33 formed in each of the bulges 32 thereof, to receive the head 41 of a fastener 40, for example, and may include a peripheral rib 34 extended into the recess 33 thereof, to form a reduced aperture 36 in the bulge 32 that is communicating with the recess 33 of the bracket 32. The peripheral rib 34 may engage with the head 41 of the fastener 40, to retain the head 41 in the recess 33 of the bulge 32 of the bracket 30.

The bracket 30 may further include an arm 37 extended therefrom, to engage with the bottle 70, and to hold and retain the bottle 70 within the chamber 14 of the bottle cage 10. For example, the arm 37 may be extended rearwardly or forwardly from the bottom portion of the bracket 30, or extended into the bottom portion of the chamber 14 of the bottle cage 10, to engage with the bottom portion of the bottle 70, and thus to hold or to retain the bottle 70 within the chamber 14 of the bottle cage 10.

The apertures 36 of the bulges 32 each may include an inner diameter smaller than that of the recess 33 of the bracket 30, to stably or snugly receive the fastener 40 therein. It is preferable that the apertures 36 of the bulges 32 each may be an oblong aperture 36 to slid ably or adjustably receive the fastener 40 therein, for allowing the bracket 30 and the bottle cage 10 to be slightly adjusted up and down relative to the fastener 40 and thus relative to the cycle frame 80, for example.

As best shown in FIG. 3, it is preferable that the bulges 32 of the bracket 30 each may include a thickness greater than that of the bottle cage 10, for allowing the bulges 32 of the bracket 30 to extend rearwardly beyond the bottle cage 10, and thus for allowing the bracket 30 to be stably positioned or attached to the bottle cage 10.

One or more, such as two seats 50 may further be provided and may each include a front surface 51 provided thereon to snugly engage with either the inner or the outer peripheral surface 19 of the bottle cage 10, and each may include a cavity 52 formed therein to receive the bulge 32 of the bracket 30, and thus to further stably or solidly secure the bracket 30 to the bottle cage 10, or to solidly retain the bottle cage 10 between the bracket 30 and the seats 50.

The seats 50 each may further include a peripheral flange 53 extended into the cavity 52 thereof, from such as the front portion, the middle portion, or the rear portion of the seat 50 to form a reduced aperture 54 therein, and to stably or snugly receive the fastener 40 therein.

In operation, the bulges 32 of the bracket 30 may first be engaged into the orifices 17 of the bottle cage 10, the seats 50 may then be engaged onto the bulges 32, or relatively, to engage the bulges 32 into the cavities 52 of the respective seats 50. The fasteners 40 may then engage through the apertures 36 of the bracket 30, and the apertures 54 of the seats 50 respectively. The fasteners 40 may be engaged through the cycle frame 80 (FIG. 3), and may be threaded with lock nuts 42, in order to secure the bottle cage 10 to the cycle frame 80.

The lock nuts 42 may also be built in or engaged in the cycle frame 80, and the fasteners 40 may be threaded to the lock nuts 42, in order to solidly secure the bottle holder to the cycle frame 80. Alternatively, a clip (not shown) or the like may be secured to the bottle cage 10 and the bracket 30 with the fasteners 40, for attaching the bottle cage 10 to the other objects, such as to the waist belts or clothes of the users.

It is to be noted that the bottle cage 10 may be easily and quickly and solidly secured to the cycle frame 80 or the other objects with the bracket 30 and/or the seats 50, and the fasteners 40. For safety purposes, additional adhesive materials may optionally be applied between the bracket 30 and the bottle cage 10 to further solidly secure the bottle cage 10 to the bracket 30.

Accordingly, the bottle holder in accordance with the present invention includes a stable structure to solidly retain the bottles in the bottle holders, and includes few elements that may be easily and quickly manufactured and assembled and attached onto cycles or the other objects.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bottle holder for attaching to various objects, said bottle holder comprising:

a bottle cage including a peripheral structure having a chamber formed therein to receive a bottle therein, said bottle cage including an inner peripheral surface and an outer peripheral surface formed thereon, and said bottle cage including at least one orifice formed therein, a bracket engaged onto said bottle cage, and including at least one bulge extended therefrom to engage into said at least one orifice of said bottle cage, and to prevent said bracket from moving up and down and sidewise relative to said bottle cage, and said bracket including an aperture formed in said at least one bulge, at least one seat engaged onto said bottle cage, and including a cavity formed therein to receive said at least one bulge of said bracket, and to have said bottle cage clamped between said bracket and said at least one seat, said at least one seat including an aperture formed therein, and at least one fastener engaged through said aperture of said at least one bulge of said bracket, and engaged through said aperture of said at least one seat, to attach said bottle cage and said bracket to the objects.

2. The bottle holder as claimed in claim 1, wherein said bottle cage includes an opening formed therein to define a pair of flaps, and to retain the bottle in said chamber of said bottle cage.

3. The bottle holder as claimed in claim 1, wherein said bracket includes a lower portion having an arm extended therefrom to engage with and to retain the bottle in said bottle cage.

4. The bottle holder as claimed in claim 1, wherein said at least one bulge of said bracket includes a recess formed therein, said at least one fastener includes a head received in said recess of said bracket.

5. The bottle holder as claimed in claim 4, wherein said at least one bulge of said bracket includes a peripheral rib extended into said recess thereof, to define said aperture in said at least one bulge, and to receive said at least one fastener.

6. The bottle holder as claimed in claim 1, wherein said at least one seat includes a peripheral flange extended into said cavity thereof, to define said aperture in said at least one seat, and to receive said at least one fastener.

* * * * *